Nov. 30, 1943.  J. W. CHALMERS  2,335,646
MACHINE FOR ASSEMBLING AND CHARGING MACHINE GUN CARTRIDGE
BELTS OF THE DISINTEGRATING TYPE
Filed Dec. 11, 1940   9 Sheets-Sheet 1

Inventor
John W. Chalmers
By
Watson, Cole, Grindle & Watson
Attys

Nov. 30, 1943.  J. W. CHALMERS  2,335,646
MACHINE FOR ASSEMBLING AND CHARGING MACHINE GUN CARTRIDGE
BELTS OF THE DISINTEGRATING TYPE
Filed Dec. 11, 1940  9 Sheets-Sheet 2

Fig. 4.

Inventor
John W. Chalmers
By
Watson, Cole, Grindle & Watson

UNITED STATES PATENT OFFICE 2,335,646

MACHINE FOR ASSEMBLING AND CHARGING MACHINE-GUN CARTRIDGE BELTS OF THE DISINTEGRATING TYPE

John Walker Chalmers, Deptford, London, England, assignor to Molins Machine Company, Limited, Deptford, London, England Application December 11, 1940, Serial No. 369,660
In Great Britain November 27, 1939

25 Claims. (Cl. 86—48)

This invention concerns improvements in or relating to machines for assembling and charging machine-gun cartridge belts of the disintegrating type.

Such belts may comprise links which are connected together by cartridges each of which passes through apertures in two successive links.

The links, which may be formed of bent sheet metal, are in one construction formed from blanks bifurcated at one end and having at the other end a single tail piece substantially centrally disposed relatively to the forked arms. The forked arms and the tail piece are bent into curved portions to contain cartridges so that the single curved portion of one link can be aligned with the curved portions formed from the forked arms of another link. By passing a cartridge through the aligned curved portions the two links will be connected together. The curved portions at the forked end of the links are arranged as clips to fit tightly on the cartridge while the single curved portion of the link is of a larger diameter and is a loose fit. This in effect forms a pivoted joint. The forked arms of a link are of different widths, the wider arm being the one through which the nose of a cartridge is to be passed first, and the narrower arm is of smaller diameter and cannot pass over the shoulder of the cartridge case but is intended to engage the shoulder. Although the usual form of link is described above, the invention is not to be considered as limited to the use of links or clips, having precisely the same structure as those described above.

According to the present invention there is provided a machine for assembling cartridge belts, comprising in combination conveyor mechanism, link delivery means for delivering to said conveyor mechanism links similarly oriented and arranged end to end so that the apertures of the single loops of links are in substantial alignment with the apertures of loops of the forked ends of adjacent links on the said conveyor mechanism, cartridge feeding means for feeding to said conveyor mechanism cartridges arranged transversely to the direction of movement of the said conveyor mechanism and with their noses opposed to apertures in the links so oriented, and means to move the cartridges endwise into link apertures lying opposed to them.

The means for feeding and orienting the chain links may comprise a magazine and a feed conveyor and means for feeding the chain links to said conveyor so that the forward and rearward apertures respectively of successive links are in alignment and means (e. g. pockets on the conveyor) for keeping said apertures in alignment.

The means for feeding cartridges with their noses opposed to apertures of successive oriented links may comprise a plurality of cartridge hoppers and removal means operable at each hopper to feed a predetermined number of cartridges at a given time from the hopper, and means for operating all the said removal means in timed relationship with one another and with the conveyor mechanism.

The present invention also provides in a machine for making cartridge belts, conveyor mechanism, a plurality of cartridge hoppers arranged at different stations along said conveyor mechanism, removal means at each hopper for feeding to said conveyor mechanism cartridges so that they lie transversely to the direction of movement of said conveyor mechanism, each said removal means being operable to feed a predetermined number of cartridges at a given time from its hopper, and means for operating the conveyor mechanism and the several removal means in timed relationship with one another.

The said removal means for feeding cartridges from a hopper may comprise a rotatable fluted drum so arranged that cartridges are fed from the hopper one at a time into the flutes of the drum. The drum may be arranged to feed cartridges into pockets or between partitions or guides on a feed conveyor (e. g. at one side of the same conveyor on which the oriented links are arranged) so that the noses of the cartridges are aligned with or opposed to apertures in oriented links.

Where a plurality of cartridge feeding hoppers are provided, the flutes of the drums and the peripheral speeds of the drums are so arranged in relation to that of the conveyor that each drum will only feed cartridges to certain pockets or between certain guides or partitions on the conveyor mechanism.

The means to move the cartridges endwise into apertures lying opposed to them may comprise an endless conveyor having pusher pieces arranged to engage the bases of cartridges and moving in a direction having components lengthwise of the cartridges and in the direction of movement of the conveyor mechanism.

Alternatively, the means to feed the cartridges endwise into the apertures in the links may comprise a reciprocating plunger. If desired, the plunger face may comprise a succession of steps each being equal to the length of an operative stroke on the bases of the cartridges so that the cartridges are moved into the link apertures by a succession of short pushes.

A machine for making cartridge belts will now be described by way of example with reference to the accompanying drawings in which:

Figure 9 is a view taken in the direction of arrow B Figure 4B showing a cross section of the machine bed and details of cartridge feeding mechanism.

Like reference numerals refer to like parts throughout the specification and drawings.

Figure 1:
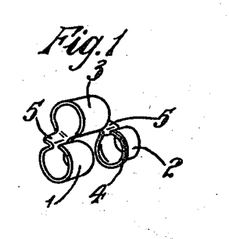
Figure 1 is a perspective view of a link.

Referring to Figure 1, the link, which is made of spring steel or other suitable material, has three loops, two of which, 1 and 2, form the female member of the link while the other loop 3 forms the male member.

The loops 1 and 2 are slightly different in diameter to suit the shell of the cartridge which is stepped down at the position where the bullet is held. The loop 1 is the larger of the two and the smaller loop 2 is provided with a curved lip 4 to form a lead for the shell when the cartridges are being assembled with the links.

Figure 2:
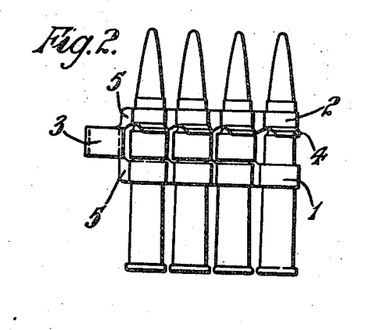
Figure 2 shows several cartridges joined by links to form a chain or belt.

The single loop 3 is considerably larger than the others and only loosely embraces a cartridge shell. When the links and cartridges are assembled as shown in Figure 2, the belt is therefore properly articulated and flexible. The two loops 1 and 2 are joined to the single loop 3 by members or shoulders 5.

Figure 3:
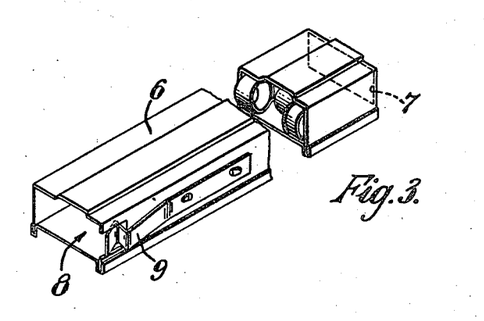
Figure 3 shows a metal charger containing links correctly oriented and ready for feeding to the machine.

The links are supplied in metal chargers 6 shown in Figure 3. These have an end wall 7 and an open mouth 8 at the opposite end. A spring catch 9 normally retains the links within the charger and all the links point in the direction shown, i. e. with the female member leading.

The construction of the machine will now be briefly outlined with reference to Figures 4A, 4B and 5A, 5B, after which a more detailed description will be given. Referring to these figures, the machine has a horizontal bed 10 along which extends the upper run of an endless conveyor 11 comprising metal plates joined by chain links to constitute said endless conveyor, the links passing round sprockets at each end of the machine bed. The metal plates, which practically abut one another on the horizontal upper run of the conveyor mechanism, are provided with equidistantly spaced arcuate flutes or shallow pockets extending transversely to the direction of movement of the conveyor.

Cartridges are placed in hoppers 12 at one side of the machine and fed therefrom to fluted drums 13 which in turn deliver the cartridges into the flutes of the conveyor plates.

At one end of the horizontal upper run of the endless conveyor there is provided a link delivery device 14 for feeding links to lie in the conveyor flutes in the desired manner as described later. The links are, as previously stated, supplied in metal chargers and the machine includes mechanism indicated by the reference 15 into which a number of charges may be placed, said mechanism automatically feeding such charges one by one into line with the link delivery device 14 and emptying the links thereinto.

The conveyor is arranged to move continuously and as it travels along the bed in the direction indicated by the arrows the flutes are charged with cartridges and links in the desired manner and these are assembled by moving cartridges transversely of the conveyor so that they pass into the loops of adjacent links and thus form a belt or chain. This transverse movement is effected by a device generally indicated by the reference 16.

After this operation, the leading end of the belt is lifted to clear the flutes in the conveyor plates and thus a continuous belt is delivered from the machine.

The machine will now be described in more detail with reference to the drawings, but the description of the charger feeding device 15 will be deferred as it will be seen that the links can be fed from chargers placed one at a time by hand on a support arranged to hold a charger in line with the link delivery device 14.

The device 14 consists of a guide tube of rectangular cross section of such dimensions as to permit links to slide easily therethrough as they pass out of the charger and at the same time to prevent any displacement of the links from their proper alignment. The device comprises a channel shaped base 17 and an angular cover 18 fixed together in the manner indicated in cross section in Figure 5B. The whole device is fixed to the bed 10 at the proper angle by a bracket 19. The inclination of the charger and the device 14 is such that the links as they slide out on to the conveyor 11 have a component of movement in the direction of movement of the top run of the conveyor. With this construction it is merely necessary to place a charger in position and open the release catch 9 to ensure the satisfactory feed of the links. As links are taken away by the conveyor 11, subsequent links will fall into their appropriate flutes on the conveyor plates.

Figure 4:
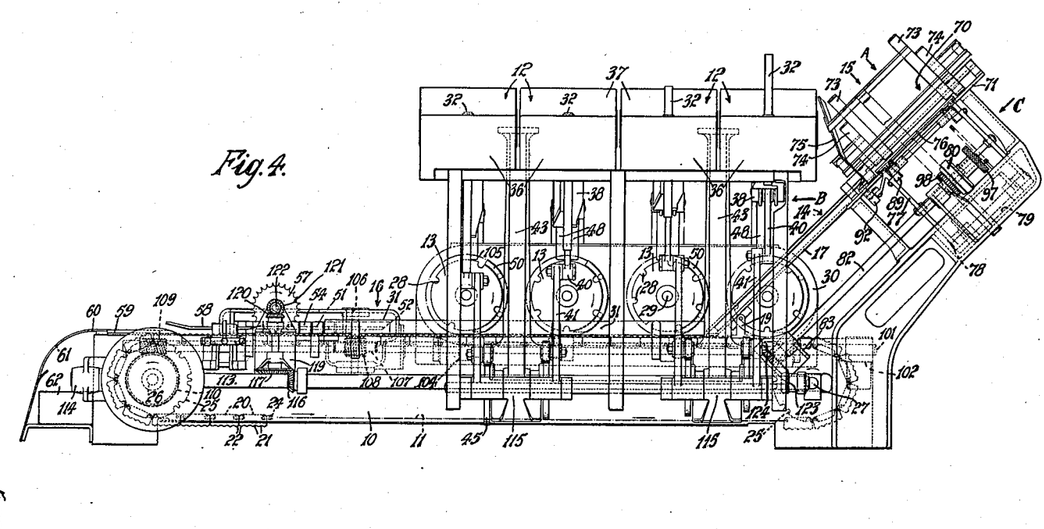
Figure 4 is a front elevation of the machine.
Figure 4A:
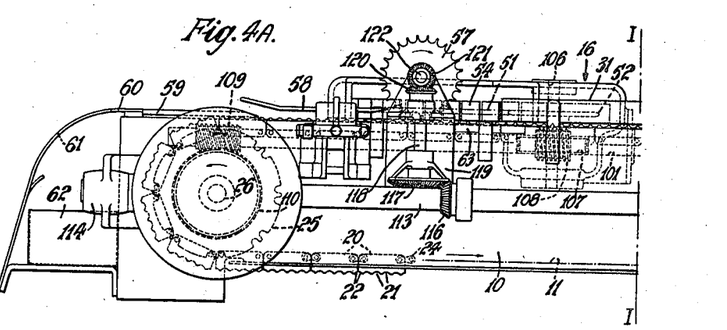
Figures 4A and 4B together constitute the view shown in Figure 4, the views joining up on the line I—I.
Figure 4B:
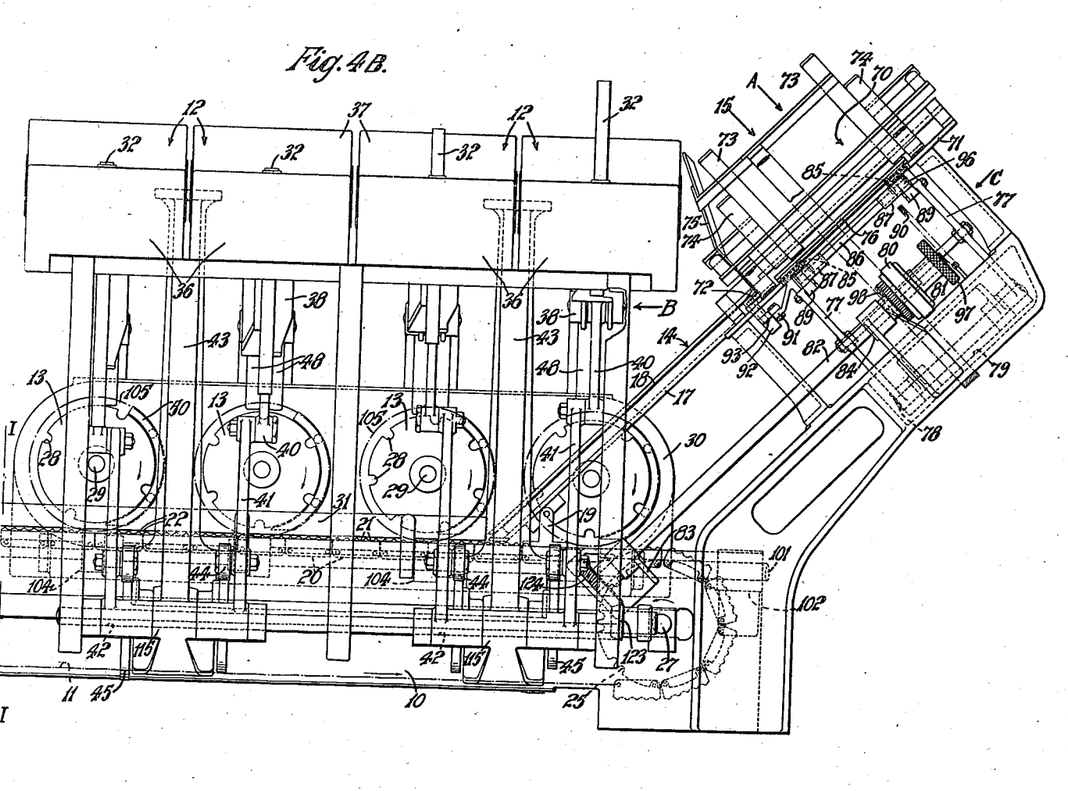
Figure 5A:
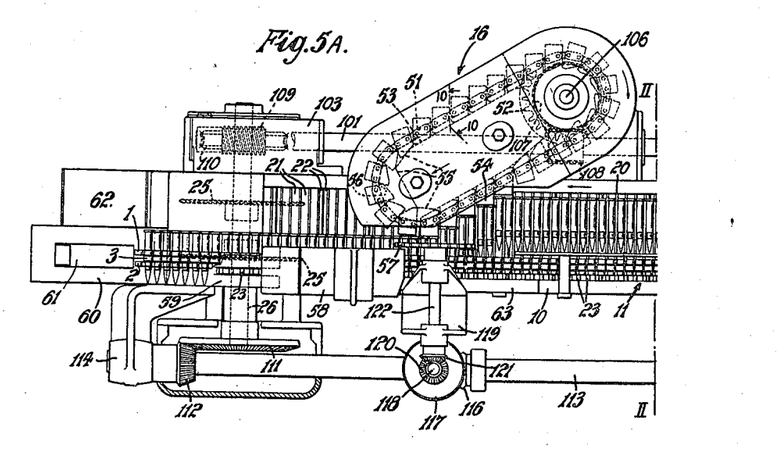
Figures 5A and 5B together comprise a plan of the machine, the views joining up on the line II—II.
Figure 5B:
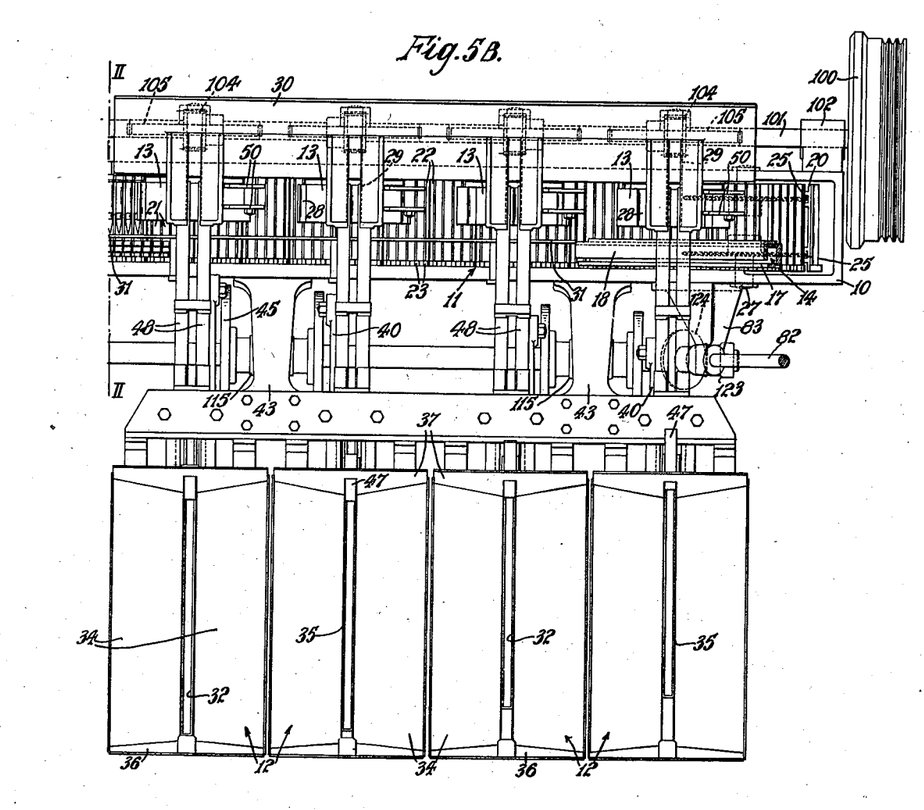
Figure 6:
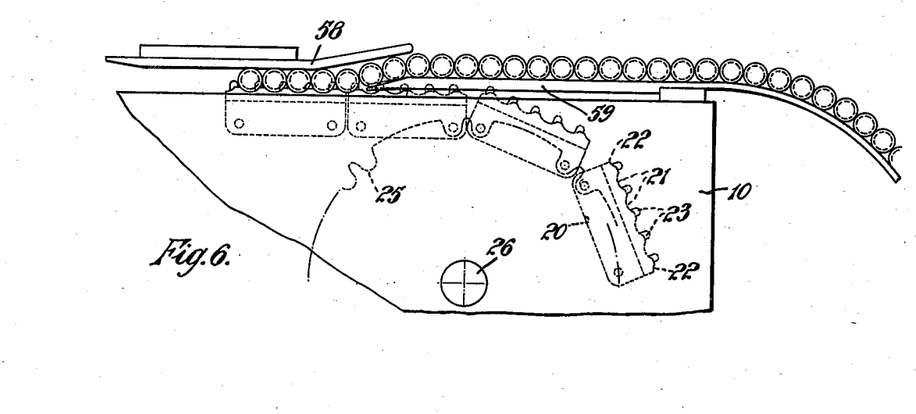
Figure 6 is a view of part of Figure 4A drawn to a larger scale.

The construction of the metal plates comprised in the conveyor is best shown in Figures 5B, 6 and 9. The plates 20 have a number of arcuate flutes 21 on their upper surfaces in each of which a cartridge may lie loosely yet without sufficient freedom to allow it to become displaced during the conveyor movement. As will be observed best from Figure 6, the ends of the plates have half-flutes 22 formed in them and when two neighbouring plates are on the upper rim of the conveyor they practically abut and the two half flutes constitute a single cartridge carrying flute. The distance from the middle of one flute 21 to the middle of the next is equal to the distance between the centres of the link loops 3 and 1—2 so that when the links are arranged end to end on the conveyor the single loop 3 of one link will lie between the loops 1 and 2 of an adjacent link and all three loops will rest in one flute. The plates are also provided with abutments 23 for the purpose of holding the links in position when cartridges are being forced into the loops as described later. These abutments are omitted from Figures 4A and 4B owing to the small scale of the views but are clear in Figures 5A and 5B. The plates 20 are joined to form an endless conveyor by single chain links 24, Figure 4A and these engage with sprocket wheels 25 suitably cut and mounted on spindles 26 and 27 respectively near the ends of the bed 10 and rotated in the direction of the arrows by means to be described later when the driving arrangements of the machine are under consideration.

The links, after being removed from the outlet of the device 16 as they fall by gravity on to the passing conveyor flutes, pass one or more stations or positions (i. e. the drums 13) at which cartridges are fed to the flutes of the conveyor. As will be seen from Figure 5B, the links are delivered on to the left hand side of the conveyor (considered in the direction of movement) and the cartridges are delivered on to the other side of the conveyor so that the noses or tips of the bullets are e. g. about ⅜" distant from the edges of the links.

The number of cartridge feeding stations may vary according to the nature of the machine gun belt to be made on a machine. The main purpose of having several stations is to permit of different kinds of cartridges being incorporated in a given belt but a plurality of stations is also desirable for the sake of high output even if all the cartridges are alike as it is possible thus to run the conveyor 11 fast and yet have each cartridge feed operating at a more moderate and satisfactory speed. Four stations are shown in the drawings and these would be suitable for feeding recurring groups or combinations of 5—6—7—4 cartridges of four different kinds the total of 22 being an arbitrary number chosen in the art for the number of cartridges in a belt before the first group recurs. The actual disposition and number of the flutes 28 of the drums 13 is determined by the kind of belt required and the flutes are merely shown equally spaced for the purpose of describing the invention. The fluted drums 13 are mounted above the conveyor with the flutes parallel with those of the conveyor. The drums are mounted on spindles 29 rotatably mounted in a casing 30 and are driven as described later so that the drums rotate in proper timed relationship with the conveyor 11 whereby the cartridges fall into their proper flutes and eventually all the conveyor flutes are filled with cartridges and links as shown in Figure 5A. A guide rail 31 separates links from cartridges and maintains alignment until the conveyor passes the device 16 where the cartridges are assembled with the links.

Figure 8:
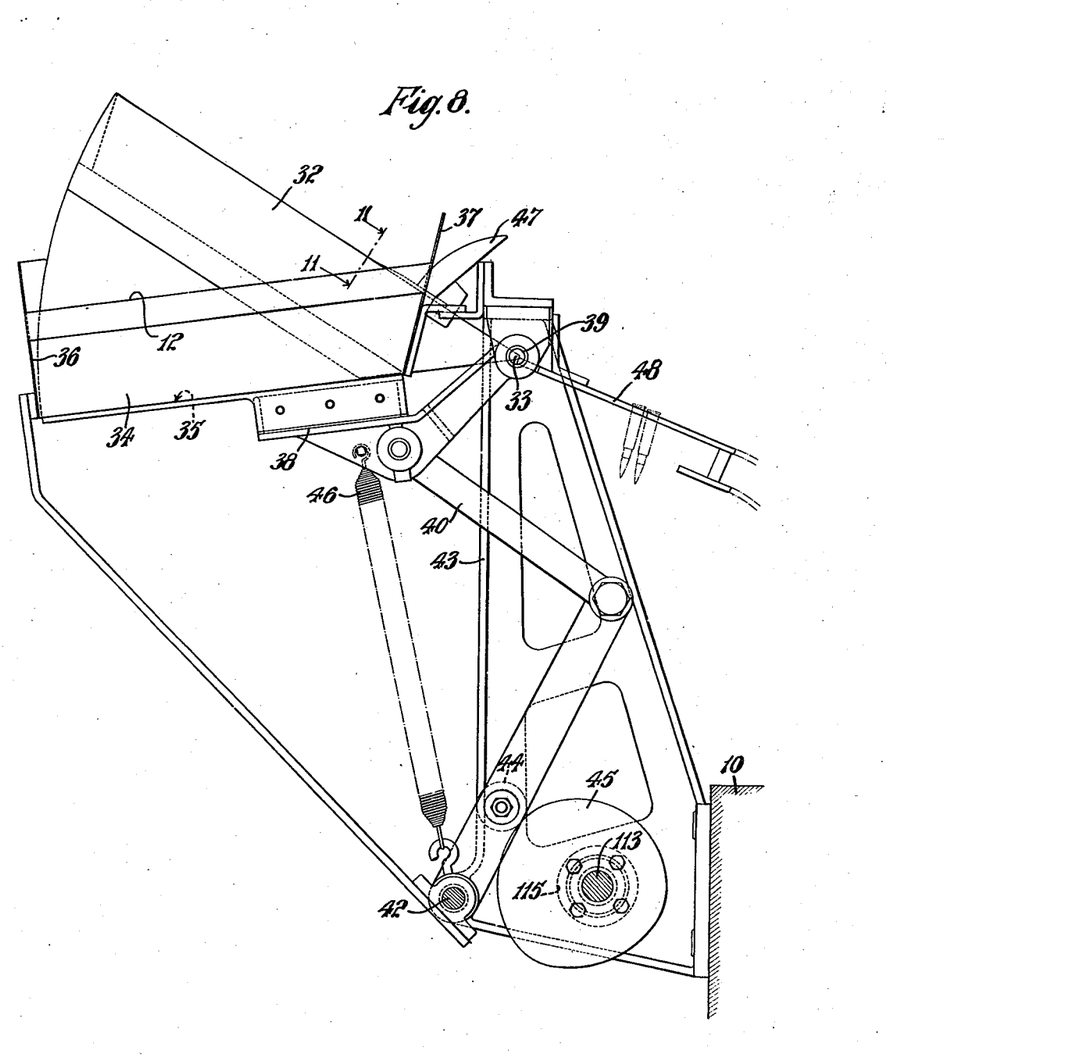
Figure 8 is a view taken in the direction of arrow B, Figure 4B showing hopper feeding mechanism.
Figure 11:
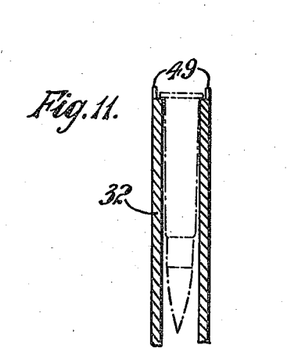
Figure 11 is a cross section on line 11—11 Figure 8 showing constructional details.

A cartridge feeding hopper and other items for delivering cartridges to the flutes 28 of a drum 13 will now be described with special reference to Figures 8, 9 and 11. The cartridges are fed from a loose mass in a hopper or box 12 by a slotted member 32 mounted for oscillation around a pivot at 33 and oscillated in a suitably vertical plane. The hopper 12 is rectangular in plan and has two side walls 34 which slope down to a narrow slot 35 in and through which the member 32 moves during its oscillation. The hopper is inclined with respect to the level of the bed 10 (see Figure 8) the end of the slot 35 nearer to the outlet end of the hopper (i. e. to the bed 10) being at a higher level. The rear end wall 36 is substantially at right angles to the slot while the front end wall 37, that is the one nearer the outlet is forwardly inclined with respect to the slot as shown.

The slotted member 32 is fixed to a lever 38 which is pivoted on pins 39 and a link 40 couples the lever 38 to a cam lever 41. The latter is pivoted at 42 to a frame or bracket 43 by means of which the whole hopper structure and its mechanism is attached to the bed 10. A roller 44 on the lever 41 engages a cam 45 mounted and driven by the main driving mechanism as described hereafter. A spring 46 effects the return movement. The slotted member 32 consists of a pair of plates, see Figure 11, spaced apart sufficiently to allow the stem-like part of a cartridge to pass easily between the plates without, however, permitting the head of the cartridge to do this. The member is of such thickness that it will move freely in the slot 35, the clearance being just sufficient for this purpose. The axis of oscillation of the member is located substantially on the plane containing the upper edges of the member.

The member 32 is of arcuate shape and is practically a sector of a circle and the mounting and movement of the member is such that at the lower position during its movement the upper edges of the slot are substantially level with the hopper slot 35 while at the upper position said edges rise clear of the mass of cartridges in the hopper. In this upper position the member 32 forms a partition dividing the hopper centrally and as will be seen from Figure 8 the upper edges of the slot slope down towards the pivotal axis and thus cartridges engaged by the member will slide downwards towards said pivot. The front wall 37 of the hopper is slotted to permit the member 32 to move freely therethrough and in view of the extent of the movement of the member a slot of considerable area is uncovered at times. To prevent cartridges falling directly from the hopper through this slot instead of moving out properly along the slotted member 32, an extension piece 47 is fitted on the member of such size and so located that the slot in the wall is always filled by the extension piece. The piece 47 is of arcuate shape being curved to an arc struck from the pivot point.

The walls of the member 32 extend as far as the pivot and when the member is in its highest position the upper edges of the plates of the member which slope towards the pivot as aforesaid are in line with a pair of fixed guide plates 48 whose edges are spaced part to the same extent as the plates of the member 32. Cartridges properly engaged by the member will therefore slide down on to the guide plates which guide them down to the fluted drums 13. It will be appreciated that with the construction so far described a cartridge might lie crosswise on the upper edges of the slotted members and prevent cartridges properly engaged thereby and remote from the hopper outlet from sliding along the member and out of the hopper when the member is in the upper position. To prevent this the plates are provided with a ramp 49 sloping upwards from the normal level. The heads of the cartridges can thus pass freely along as may be seen from Figure 11 in spite of any such misplaced cartridge which will slide forwards on the ramp and be raised thereby.

In this way a superimposed column of cartridges is formed above each fluted drum, see Figure 2, and as the drum rotates a cartridge will fall into a flute as the latter passes beneath the column of cartridges. To retain the cartridges in the flutes until they reach the point where they fall into the conveyor flutes, arcuate shields or guides 50 are provides fixed as shown in Figure 9 to the casing 30.

Figure 10:
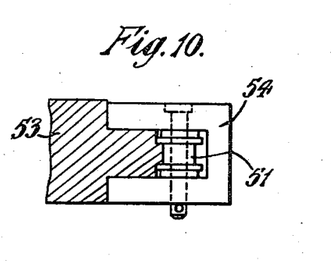
Figure 10 is a cross section of line 10—10 Figure 5A showing constructional details.

The cartridges after being fed into the flutes of the conveyor will lie with their noses opposed to substantially aligned apertures in adjacent links. The cartridges and links are then moved by the conveyor past the device 16 which pushes the cartridges into the apertures in the links. This device consists of an endless chain 51 mounted on a sprocket 52 at one end and engaged by a guide 53. The chain has blocks or pusher pieces 54 which are arranged to engage the bases of the cartridges as shown in Figure 5A and, as will be seen from the figure, the pushers move in a direction having a component lengthwise of the conveyor flutes and also a component at right angles to the flutes, that is, in the direction of movement of the conveyor. The cross section of the guide 53 may be seen in Figure 10. For most of its length the guide is engaged by the rear edges of the pushers which are thus controlled, but this control ceases where the stepped parts of the guide are cut away at 55 and the remaining part 56 of the guide which is mainly curved engages only the rollers of the chain 51. The part 56 is shaped as shown in Figure 5A and by this arrangement the conveyor blocks disengage from the cartridges in the manner shown and without displacing them on the conveyor 11. The chain 51 is tightened by moving the guide 53 in the direction of the arrow, Figure 5A.

During the assembling operation the reaction is taken by the abutments 23 on the conveyor plates 20, the abutments registering with the shoulders 5 of the links and holding the latter firmly and squarely in position while the cartridges are forced into the loops of the links. Meanwhile, a fluted wheel 57 rotating in the direction of the arrow assists in locating the cartridges for assembly and corrects any slight displacement of the cartridges in the conveyor flutes which might result in the edge of the brass shell fouling the edge of a link loop. The conveyor is supported laterally against the thrust of the assembling operation by an adjustable pressure strip 53 which engages the left hand edges of the plates 20.

Further movement of the conveyor 11 brings the freshly assembling items beneath a pressure plate 58 whose function is described below and shortly afterwards the completed belt is lifted out of engagement with the flutes of the conveyor 11 by a stripping plate 59. These parts are shown to a larger scale in Figure 6 which is a view of the end part of Figure 4A but taken from the opposite direction.

The leading end of the finished belt passes over a guide 60 which is perforated at 61 to permit any loose links which may occur (e. g. at starting up the machine) to fall into a box 62. The weight of the length of finished belt hanging from the machine is considerable and the purpose of the pressure plate 58, which is adjustable is to grip the assembled belt beneath it sufficiently to prevent the overhanging part from pulling the belt prematurely out of the conveyor flutes.

Figure 7:
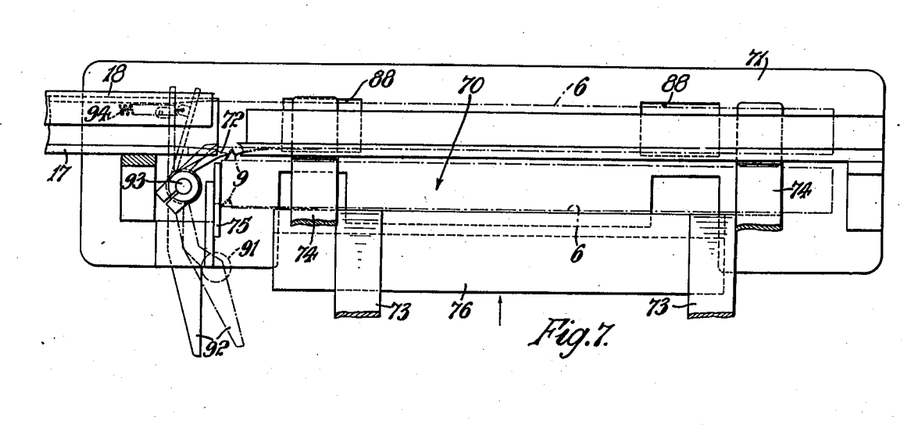
Figure 7 is a plan of part of Figure 4B drawn to a larger scale, the view being taken in the direction of the arrow A.
Figure 12:
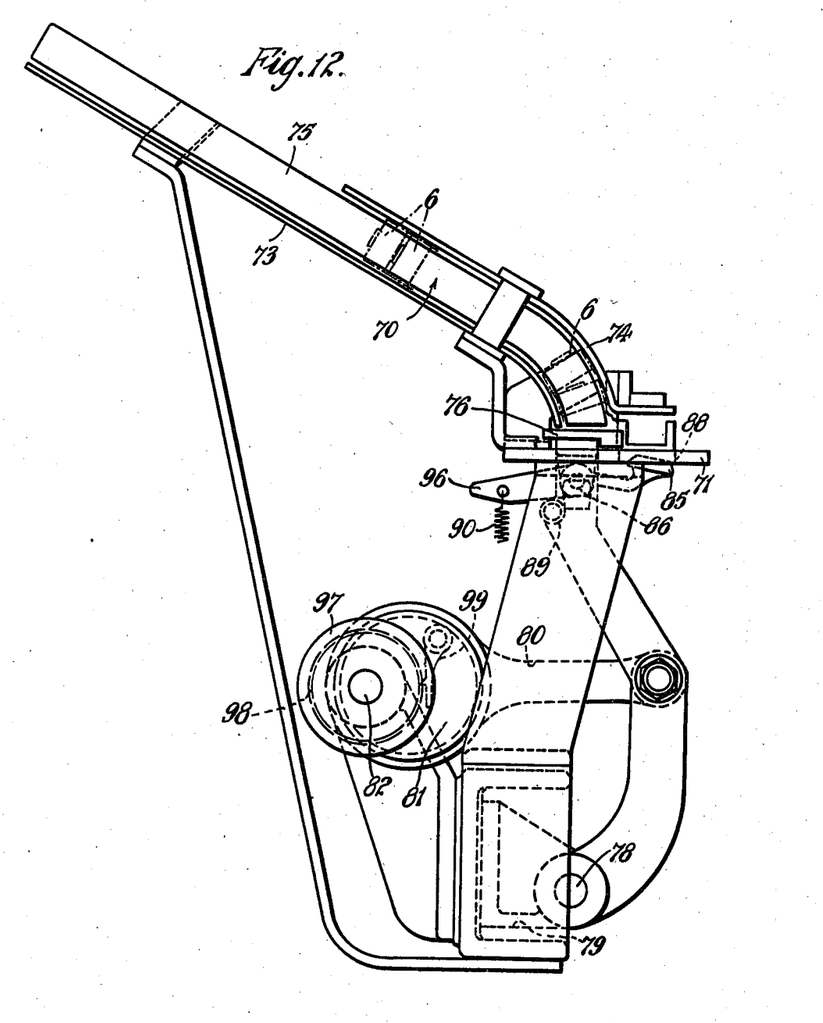
Figure 12 is a view of part of Figure 4B in the dretion of the arrow C.

The charger feeding device 15 as shown in side elevation at the right hand end of Figure 4B and in end elevation in Figure 12, while Figure 7 shows the feed table and other parts appertaining thereto. The device comprises a magazine or stacker 70 in which the boxes or chargers 6 are superimposed, such magazine being supported on a flat base or feed table 71. The base plate slopes down at an angle as shown in Figure 4B and its surface is parallel to the slope of the link feeding device 14. The boxes are brought in turn to lie lengthwise in the line of feeding by devices which will be described later and as each box comes to occupy the link feeding position (the upper position in Figure 7 where the boxes are shown in chain lines) a mechanically operated pawl 72 opens the spring catch 9 and permits the links to slide out and downwards into the guide tube formed by the parts 17 and 18 which lead them down to the conveyor 11. As said conveyor removes links from the base of the guide tube, further links slide out of the box into the upper part of the guide tube the feed being by gravity and only controlled by the rate at which the conveyor 11 takes away the links. When sufficient time has elapsed for a box to empty under normal conditions, the empty box is pushed away from the link feeding position and across the table 71 from which it falls into a tray (not shown). At the same time a fresh box is moved from the base of the stacker 70 (i. e. the lower position in Figure 7 where the box 6 is shown in chain lines) across the table and into the link feeding position.

The box magazine consists of two back rails 73 and front or cover rails 74 and a sloping end rail 75, all arranged and supported by the base plate 71 as shown in the figures. The boxes are ejected from the link feeding position and fed thereto from the base of the magazine by a pusher plate 76 fixed to the ends of a pair of levers 77 which oscillate about the axis of a shaft 78 supported in a bearing bracket 79. The plate is operated by an eccentric rod and strap marked jointly 80, the strap running on an eccentric 81 fitted on a rotatable shaft 82. This shaft is journalled in support brackets 83 and 84 and driven as described later.

In order to locate and retain a box in the feeding position, movable abutments 85 are provided. These are formed at the ends of levers fixed to a spindle 86 rotatably mounted in brackets 87 fixed beneath the table 71. From Figure 3 it will be seen that the chargers or boxes have a flanged base and the operative part of an abutment is shaped to enter the space between the flanges and locate the box as desired. A top guide 95 of angular section simultaneously locates the top surface of the box. The abutments move up and down through holes 88 in the table 71 and are operated at the proper times by the oscillating levers 77 in the following manner. Each abutment is carried on a double armed lever, see Figure 12 and the ends 96 remote from the abutment are suitably shaped to engage rollers 89 rotatably supported on the levers 77. Springs 90 effect the return movement and cause the abutments to project through the table while the levers 77 move the abutments down again. Thus, as a box is about to be ejected from the link feeding position, the abutments are lowered to permit this movement and as the pusher plate 76 moves back again, the abutments rise and locate the freshly fed box. The rollers 89 are eccentrically mounted on the levers 77 to permit adjustment of the timing of the abutments.

The pawl 72 is also operated by the lever movement. A roller 91 is attached to the left hand lever, Figure 4B, and engages a lever 92 which is fixed to the spindle 93 on which the pawl 72 is fitted. A spring 94 effects the return movement.

As shown in Figure 7, a charger is in the link discharging position and the pawl 72 (full lines) is holding open the spring 9. The lever 92 (full lines) is still in engagement with the roller 91 and the pusher plate 76 is moving in the direction of the arrow. Further movement of the plate 76 will push the box 6 from the base of the magazine to the link discharging position and as this movement occurs the roller 91 will permit lever 92 to move to the right until finally it occupies the chain line position when, of course, the pawl 72 will also be in the chain line position. This enables the empty charger to be pushed off the table and the new one to take its place. As the pusher plate 76 moves back again the roller 91 engages the lever 92 and opens the spring 9 of the new box. It may sometimes happen that an incompletely filled box is put in the machine or possibly all of the links in the box do not slide out owing to some defect, for instance, a box may become bent or distorted in transport. In such cases enough links will not be fed to the conveyor unless these shortages are made good. To effect this the feed of boxes to the link feeding position may be accelerated by turning the handwheel 97. This is fixed to the eccentric 81 which is loosely mounted on the shaft 82 and driven by a ratchet wheel 98 which is fixed to the shaft and engages a spring controlled pawl 99 pivoted on the eccentric. Normally the eccentric rotates with the shaft, but by rotating the handwheel the pawl trips around the ratchet wheel and the eccentric may be advanced as much as is necessary. The machine is driven by a pulley 100 fixed to a mainshaft 101 supported in bearings 102 and 103 and in others formed within the casing 30 and the housing enclosing the device 16. The mainshaft carries four worms 104 driving four worm wheels 105 each of the latter being fixed to a spindle 29 of a drum 13. The vertical spindle 106 to which is fixed the driving sprocket 52 of the device 16 has a worm wheel 107 fixed to it which engages a further worm 108 on the mainshaft. Another worm 109 near the end of the shaft engages a worm wheel 110 fixed to the spindle 26 which supports the conveyor sprockets 25. In this way the drums, conveyor 11 and the conveyor 51 are all driven at the desired speeds.

The spindle 26 has a large bevel gear 111 on it which engages with a smaller one, 112, fixed to a camshaft 113. The camshaft is supported in a bearing 114 and in others 115 formed in the hopper support frames 43.

A small bevel gear 116 on the camshaft drives a larger one 117 fixed on a vertical spindle 118 journalled in a bracket 119. The upper end of this spindle has a bevel gear 120 on it engaging with a similar gear 121 fixed on the spindle 122 which carries the fluted wheel 57. The camshaft 113 also has the cams 45, previously mentioned, fixed on to it and at its end has a bevel gear 123 on it which drives a larger bevel gear 124 fixed on the shaft 82. Thus the turning wheel, hopper mechanism and the box feeding device are all driven at the proper speeds and in time with the other moving parts of the machine.

What I claim as my invention and desire to secure by Letters Patent is:

1. In a machine for assembling and charging machine gun cartridge belts of the disintegrating type, conveyor mechanism, a plurality of cartridge hoppers arranged at different stations along said conveyor mechanism, removal means at each hopper for feeding to said conveyor mechanism cartridges so that they lie transversely to the direction of movement of said conveyor mechanism, each said removal means being operable to feed a predetermined number of cartridges at a given time from its hopper, and means for operating the conveyor mechanism and the several removal means in timed relationship with one another.

2. In a machine for charging clips appertaining to cartridge belts for automatic guns, conveyor mechanism having pockets, a plurality of cartridge hoppers arranged to supply cartridges at different stations along said conveyor mechanism, a plurality of rotatable fluted drums, one for each hopper at each station, said flutes being each arranged to receive a single cartridge from a hopper, and means to operate said conveyor mechanism and said drums in timed relationship with each other to effect the delivery of the cartridges to the pockets of the conveyor mechanism in a predetermined sequence during movement of the conveyor.

3. A machine for assembling and charging machine-gun cartridge belts of the disintegrating type, comprising in combination, conveyor mechanism adapted to feed links which have a curved portion at one end and aligned clips spaced apart at the opposite end, the said conveyor mechanism being arranged to feed the links similarly oriented with a curved portion at one end of each link between and aligned with the clips of an adjacent link, and simultaneously to feed a succession of cartridges arranged transversely to the direction of movement and with their noses facing clips in the oriented links, a plurality of cartridge hoppers arranged to supply cartridges at different stations along said conveyor mechanism, removal means at each hopper for each station for feeding to said conveyor mechanism during movement of the latter cartridges so that they lie transversely to the direction of movement of the conveyor mechanism, each said removal means being operable to feed a predetermined number of cartridges during a given time from its hopper, means to operate the conveyor mechanism and the several removal means in timed relationship with one another, means to maintain unassembled cartridges and links in the said formation during this feeding movement, and means to move cartridges endwise into the clips lying opposed to them.

4. A machine for assembling and charging machine-gun cartridge belts of the disintegrating type, comprising in combination, an endless conveyor adapted to feed links which have a curved portion at one end and aligned clips spaced apart at the opposite end, the said conveyor mechanism being arranged to feed the links similarly oriented with a curved portion at one end of each link between and aligned with the clips of an adjacent link, and simultaneously to feed a succession of cartridges arranged transversely to the direction of movement and with their noses facing clips in the oriented links, pockets in said endless conveyor to maintain unassembled cartridges and links in the said formation during this feeding movement, a plurality of cartridge hoppers arranged to supply cartridges at different stations along said conveyor, a fluted drum at each hopper at each station to feed cartridges to said pockets during movement of the conveyor, each said drum being operable to feed a predetermined number of cartridges during a given time from its hopper, means to operate said conveyor and said drums in timed relationship with each other to effect delivery of individual cartridges to individual pockets in a predetermined sequence, and means to move cartridges endwise into the clips lying opposed to them.

5. A machine for assembling and charging machine-gun cartridge belts of the disintegrating type, comprising in combination, an endless conveyor adapted to feed links which have a curved portion at one end and aligned clips spaced apart at the opposite end, the said conveyor mechanism being arranged to feed the links similarly oriented with a curved portion at one end of each link between and aligned with the clips of an adjacent link, and simultaneously to feed a succession of cartridges arranged transversely to the direction of movement and with their noses facing clips in the oriented links, pockets in said endless conveyor to maintain unassembled cartridges and links in the said formation during this feeding movement, means to deliver links similarly oriented to said pockets, a plurality of cartridge hoppers arranged to supply cartridges at different stations along said conveyor, a fluted drum at each hopper at each station to feed cartridges to said pockets, each said drum being operable while the conveyor is moving to feed a predetermined number of cartridges during a given time from its hopper, means to operate said conveyor and said drums in timed relationship with each other to effect delivery of individual cartridges to individual pockets in a predetermined sequence, and means to move cartridges endwise into the clips lying opposed to them.

6. In a machine for assembling and charging machine-gun cartridge belts of the disintegrating type, conveyor mechanism including a continuously moving conveyor adapted to feed links which have a curved portion at one end and aligned clips spaced apart at the opposite end, the said conveyor mechanism being arranged to feed the links similarly oriented with a curved portion at one end of each link between and aligned with the clips of an adjacent link, and simultaneously to feed a succession of cartridges arranged transversely to the direction of movement and with their noses facing clips in the oriented links, and a plurality of pusher elements carried by said conveyor and operable during movement of the conveyor mechanism simultaneously to move a plurality of cartridges endwise into clips faced thereby, said pusher elements being, for the purpose of inserting the cartridges into the clips, arranged to engage the bases of cartridges and movable in a direction having components lengthwise of the cartridges and in the direction of movement of the conveyor.

7. In a machine for assembling and charging machine-gun cartridge belts of the disintegrating type, conveyor mechanism including a continuously moving conveyor adapted to feed links which have a curved portion at one end and aligned clips spaced apart at the opposite end, the said conveyor mechanism being arranged to feed the links similarly oriented with a curved portion at one end of each link between and aligned with the clips of an adjacent link, and simultaneously to feed a succession of cartridges arranged transversely to the direction of movement and with their noses facing clips in the oriented links, a plurality of pusher elements carried by said conveyor and operable during movement of the conveyor mechanism to move cartridges endwise into the clips faced thereby, said pusher elements being, for the purpose of inserting the cartridges into the clips, arranged to engage the bases of cartridges and movable in a direction having components lengthwise of the cartridges and in the direction of movement of the conveyor, and an abutment movable with said conveyor to prevent substantial movement of the links in a direction transverse to the direction of movement of the conveyor during the insertion of the cartridges into the clips.

8. In a machine for assembling and charging machine-gun cartridge belts of the disintegrating type, conveyor mechanism adapted to feed links which have a curved portion at one end and aligned clips spaced apart at the opposite end, the said conveyor mechanism being arranged to feed the links similarly oriented with a curved portion at one end of each link between and aligned with the clips of an adjacent link, and simultaneously to feed a succession of cartridges arranged transversely to the direction of movement and with their noses facing clips in the oriented links, means to maintain unassembled cartridges and links in the said formation during this feeding movement, an endless conveyor, a plurality of pusher elements carried by said endless conveyor and operable during movement of the conveyor mechanism to move cartridges endwise into the clips faced thereby, said pusher elements being, for the purpose of inserting the cartridges into the clips, arranged to engage the bases of cartridges and movable in a direction having components lengthwise of the cartridges and in the direction of movement of the conveyor mechanism, and an abutment movable with said conveyor mechanism to prevent substantial movement of the links in a direction transverse to the direction of movement of the conveyor mechanism during the insertion of the cartridges into the clips.

9. A machine for charging clips apertaining to cartridge belts for automatic guns comprising conveyor mechanism having pockets movable in an endless path and arranged to feed forwardly similarly oriented clips and simultaneously to feed a succession of cartridges in said pockets transversely to the direction of movement of the conveyor mechanism and each with its nose facing a clip, and means operable during movement of the conveyor mechanism to move the cartridges endwise into the clips lying opposed to them, said means comprising an endless conveyor, a plurality of pusher elements carried by said endless conveyor and operable during movement of the conveyor mechanism to engage the bases of cartridges and movable in a direction having components lengthwise of the cartridges and in the direction of movement of the conveyor mechanism, and an abutment movable with said conveyor mechanism to prevent substantial movement of the links in a direction transverse to the direction of movement of the conveyor mechanism during the insertion of the cartridges into the clips.

10. In a machine for charging cartridge belts for use with automatic guns, conveyor mechanism arranged simultaneously to feed a succession of cartridge clips and cartridges aligned with said clips for insertion thereinto, and pusher elements operable during movement of the conveyor mechanism to engage the bases of cartridges and to insert them into the clips by moving in a direction having components lengthwise of the cartridges and in the direction of movement of the conveyor mechanism.

11. A machine for charging clips appertaining to cartridge belts for automatic guns comprising conveyor mechanism arranged to feed forwardly similarly oriented clips and simultaneously to feed a succession of cartridges arranged transversely to the direction of movement of the conveyor mechanism and each with its nose facing a clip, means operable during movement of the conveyor mechanism to move the cartridges endwise into the clips lying opposed to them, said means comprising pusher elements each being arranged simultaneously to engage the bases of a plurality of cartridges and for the purpose of inserting the cartridges into the clips to move with components lengthwise of the cartridges and in the direction of movement of the conveyor mechanism, and means to maintain the faces of the pusher elements substantially normal to the axes of the cartridges which they engage, respectively, while said elements are active.

12. A machine for charging clips appertaining to cartridge belts for automatic guns comprising conveyor mechanism having pockets movable in an endless path and arranged to feed forwardly similarly oriented clips and simultaneously to feed a succession of cartridges in said pockets transversely to the direction of movement of the conveyor mechanism and each with its nose facing a clip, and means operable during movement of the conveyor mechanism to move the cartridges endwise into the clips lying opposed to them, said means comprising an endless conveyor and pusher elements carried thereby for engagement with the bases of cartridges, said pusher elements being movable in a direction having components lengthwise of the cartridges and in the direction of movement of the conveyor mechanism, and an abutment movable with said conveyor mechanism to prevent substantial movement of the links in a direction transverse to the direction of movement of the conveyor mechanism during the insertion of the cartridges into the clips, and means so controlling said pusher elements that their faces are kept substantially square to the bases of the cartridges during engagement with the latter.

13. A machine for charging clips appertaining to cartridge belts for automatic guns comprising conveyor mechanism arranged to feed forwardly similarly oriented clips and simultaneously to feed a succession of cartridges arranged transversely to the direction of movement of the conveyor mechanism and each with its nose facing a clip, and means operable during movement of the conveyor mechanism to move the cartridges endwise into the clips lying opposed to them, said means comprising pusher elements movable in an endless path and arranged to engage the bases of cartridges and while so engaging the cartridges to move with components lengthwise of the cartridges and in the direction of movement of the conveyor mechanism, and means so controlling said usher elements that their faces are kept substantially square to the bases of the cartridges during engagement with the latter.

14. A machine for charging clips appertaining to cartridge belts for automatic guns comprising conveyor mechanism arranged to feed forwardly similarly oriented clips and simultaneously to feed a succession of cartridges arranged transversely to the direction of movement of the conveyor mechanism and each with its nose facing a clip, and means operable during movement of the conveyor mechanism to move the cartridges endwise into the clips lying opposed to them, said means comprising pusher elements, each being arranged simultaneously to engage the bases of a plurality of cartridges and for the purpose of inserting the cartridges into the clips to move with components lengthwise of the cartridges and in the direction of movement of the conveyor mechanism, and means so controlling said pusher elements that their faces are kept substantially square to the bases of the cartridges during engagement with the latter.

15. In a machine for charging clips appertaining to cartridge belts for automatic guns, conveyor mechanism having pockets to receive cartridges and maintain them arranged transversely to the direction of movement of the conveyor mechanism, means to move the conveyor mechanism, a plurality of cartridge hoppers arranged at different stations along said conveyor mechanism, removal means at each hopper for feeding cartridges to the conveyor pockets during movement of the conveyor mechanism, the removal means and the conveyor mechanism being driven in timed relationship and so arranged that each of the removal means delivers in a given period of time cartridges to each of a predetermined number of pockets in the conveyor mechanism.

16. Apparatus for feeding rod-shaped articles, comprising in combination, conveyor-mechanism comprising an endless conveyor having a plurality of substantially equispaced pockets each of which is adapted to receive a single article, a plurality of hoppers arranged at different stations along said conveyor-mechanism, a rotatable drum having peripheral flutes substantially parallel with the axis of rotation of the drum at each hopper for feeding to said conveyor-mechanism during movement of the latter articles so that they lie transversely to the direction of movement of said conveyor-mechanism, the speed of the drums being so correlated to the speed of the conveyor-mechanism and the parts so arranged that during a cycle of operation of all of the drums, each drum will feed a predetermined number of articles to certain pockets of the conveyor-mechanism.

17. A machine for charging clips appertaining to cartridge belts for automatic guns, comprising in combination, conveyor mechanism comprising an endless conveyor having a straight upper run and having a plurality of substantially equispaced pockets each of which is adapted to receive a single cartridge lying transversely to the direction of movement of the conveyor, a plurality of hoppers arranged at different stations along and above the straight upper run of the conveyor, a rotatable drum having peripheral flutes substantially parallel with the axis of rotation of the drum at each hopper for feeding cartridges to the pockets of the drums which latter are rotated at the same speed, said speed being so correlated to the speed of the conveyor and the parts so arranged that during a cycle of operations of all of the drums each drum will, during movement of the conveyor, feed a predetermined number of cartridges to certain pockets on the conveyor, wherein the aggregate number of flutes of all the drums taken together is such as to provide that cartridges are fed in one complete rotation of the drums to a number of successive pockets equal to the said aggregate number of flutes.

18. A machine for assembling and charging machine-gun cartridge belts of the disintegrating type, comprising in combination, an endless conveyor adapted to feed links which have a curved portion at one end and aligned clips spaced apart at the opposite end, the said conveyor mechanism being arranged to feed the links similarly oriented with a curved portion at one end of each link between and aligned with the clips of an adjacent link, and simultaneously to feed a succession of cartridges arranged transversely to the direction of movement and with their noses facing clips in the oriented links, pockets in said endless conveyor to maintain unassembled cartridges and links in the said formation during this feeding movement, means to deliver links similarly oriented to said pockets, a plurality of cartridge hoppers arranged at different stations along said conveyor, a fluted drum at each hopper to feed cartridges to said pockets during movement of the conveyor, each said drum being operable to feed a predetermined number of cartridges during a given time from its hopper, means to operate said conveyor and said drums in timed relationship with each other to effect delivery of cartridges at different positions along said conveyor, and means to move cartridges endwise into the clips lying opposed to them, wherein the drums are rotated at the same angular speed and wherein the aggregate number of flutes of all the drums taken together is such that cartridges are fed in one complete rotation of the drums to a number of successive pockets equal to the said aggregate number of flutes.

19. A machine for charging clips appertaining to cartridge belts for automatic guns comprising in combination an endless conveyor adapted to feed clips and simultaneously to feed a succession of cartridges arranged transversely to the direction of movement of the conveyor and with their noses facing clips, pockets in said endless conveyor to maintain unassembled cartridges and clips in the said formation during this feeding movement, a plurality of cartridge hoppers arranged at different stations along said conveyor, removal means at each hopper to feed cartridges to said pockets during movement of the conveyor, the speed of the removal means being so correlated to the speed of the conveyor and the parts so arranged that during a cycle of operation of all the removal means each removal means will feed a predetermined number of cartridges to certain pockets on the conveyor mechanism in predetermined arrangement, and means operable during movement of the conveyor to move cartridges endwise into the clips lying opposed to them, said means comprising an endless conveyor-device, a plurality of pusher elements carried by said endless conveyor-device and adapted to engage the bases of cartridges and movable in a direction having components lengthwise of the cartridges and in the direction of movement of the conveyor mechanism, and an abutment movable with said conveyor mechanism to prevent substantial movement of the links in a direction transverse to the direction of movement of the conveyor mechanism during the insertion of the cartridges into the clips.

20. A machine for charging clips appertaining to cartridge belts for automatic guns comprising in combination, an endless conveyor adapted to feed clips and simultaneously to feed a succession of cartridges arranged transversely to the direction of movement of the conveyor and with their noses facing clips, pockets in said endless conveyor to maintain unassembled cartridges and clips in the said formation during this feeding movement, a plurality of cartridge hoppers arranged at different stations along said conveyor, removal means at each hopper to feed cartridges to said pockets during movement of the conveyor, the speed of the removal means being so correlated to the speed of the conveyor and the parts so arranged that during a cycle of operation of all the removal means each removal means will feed a predetermined number of cartridges to certain pockets on the conveyor mechanism so that cartridges from the different hoppers lie on the conveyor mechanism in predetermined sequence, and means operable during movement of the conveyor to move cartridges into clips lying opposed to them, said means comprising pusher-elements, each being arranged simultaneously to engage the bases of a plurality of cartridges and for the purpose of inserting the cartridges into the clips to move with components lengthwise of the cartridges and in the direction of movement of the conveyor mechanism.

21. A machine for charging clips appertaining to cartridge belts for automatic guns comprising in combination, an endless conveyor adapted to feed clips and simultaneously to feed a succession of cartridges arranged transversely to the direction of movement of the conveyor and with their noses facing clips, pockets in said endless conveyor to maintain unassembled cartridges and clips in the said formation during this feeding movement, a plurality of cartridge hoppers arranged at different stations along said conveyor, removal means at each hopper to feed cartridges to said pockets during movement of the conveyor, the speed of the removal means being so correlated to the speed of the conveyor and the parts so arranged that during a cycle of operation of all the removal means each removal means will feed a predetermined number of cartridges to certain pockets on the conveyor mechanism so that cartridges from the different hoppers lie on the conveyor mechanism in predetermined sequence, means operable during movement of the conveyor to move cartridges into the clips lying opposed to them, said means comprising pusher-elements, each being arranged simultaneously to engage the bases of a plurality of cartridges and for the purpose of inserting the cartridges into the clips to move with components lengthwise of the cartridges and in the direction of movement of the conveyor mechanism, and means to control the pusher elements while engaging the bases of cartridges so that their faces remain substantially square to the bases of the cartridges.

22. A machine for charging clips appertaining to cartridge belts for automatic guns comprising in combination, an endless conveyor adapted to feed clips and simultaneously to feed a succession of cartridges arranged transversely to the direction of movement of the conveyor and with their noses facing clips, pockets in said endless conveyor to maintain unassembled cartridges and clips in the said formation during this feeding movement, a plurality of cartridge hoppers arranged at different stations along said conveyor, removal means at each hopper to feed cartridges to said pockets during movement of the conveyor, a reservoir located between the outlet of each hopper and its removal means to maintain a reserve supply, the speed of the removal means being so correlated to the speed of the conveyor and the parts so arranged that during a cycle of operation of all the removal means each removal means will feed a predetermined number of cartridges to certain pockets on the conveyor mechanism so that cartridges from the different hoppers lie on the conveyor mechanism in predetermined sequence, and means operable during movement of the conveyor to move cartridges endwise into the clips lying opposed to them, said means comprising an endless conveyor, a plurality of pusher elements carried by said endless conveyor and adapted to engage the bases of cartridges and movable in a direction having components lengthwise of the cartridges and in the direction of movement of the conveyor mechanism, and an abutment movable with said conveyor mechanism to prevent substantial movement of the clips in a direction transverse to the direction of movement of the conveyor mechanism during the insertion of the cartridges into the clips.

23. In a machine for charging clips appertaining to cartridge belts for automatic guns, the combination with a continuously moving conveyor, of a plurality of cartridge feeding devices disposed at spaced intervals along said conveyor, each of said feeding devices including means for delivering onto said conveyor cartridges arranged transversely of the direction of movement of the conveyor, and means for operating said conveyor and said devices in such timed relation that cartridges are delivered by each device in spaced relation lengthwise of said conveyor with cartridges delivered by another device arranged therebetween.

24. In a machine for charging clips appertaining to cartridge belts for automatic guns, the combination with a continuously moving conveyor, of means delivering to said conveyor cartridges arranged transversely of said conveyor and cartridge clips aligned with said cartridges and spaced therefrom laterally of the conveyor, laterally spaced members for respective engagement with said cartridges and clips to effect insertion of the cartridges in the clips, means for moving said members, during such engagement, as one in the direction of movement of the conveyor at the speed of the latter, and relatively in a direction transverse thereto so as to decrease the spacing therebetween and thereby to insert the cartridges and means to maintain the faces of the pusher elements substantially normal to the axes of the cartridges which they engage, respectively, while said elements are active.

25. A machine for charging clips appertaining to cartridge belts for automatic guns comprising conveyor mechanism arranged to feed forwardly similarly oriented clips and simultaneously to feed a succession of cartridges arranged transversely to the direction of movement of the conveyor mechanism and each with its nose facing a clip, and means operable during movement of the conveyor mechanism to move the cartridges endwise into the clips lying opposed to them, said means comprising pusher elements, means moving said pusher elements in an endless path into engagement with the bases of cartridges and with components lengthwise of the cartridges and in the direction of movement of the conveyor mechanism during such engagement, and means to maintain the faces of the pusher elements substantially normal to the axes of the cartridges which they engage, respectively, while said elements are active.

JOHN WALKER CHALMERS.